United States Patent
Takami

(10) Patent No.: US 12,501,148 B2
(45) Date of Patent: Dec. 16, 2025

(54) IMAGE CAPTURING APPARATUS, CONTROL UNIT FOR IMAGE CAPTURING APPARATUS, AND STORAGE MEDIUM

(71) Applicant: CANON KABUSHIKI KAISHA, Tokyo (JP)

(72) Inventor: Etsuya Takami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

(21) Appl. No.: 18/509,099

(22) Filed: Nov. 14, 2023

(65) Prior Publication Data

US 2024/0171852 A1    May 23, 2024

(30) Foreign Application Priority Data

Nov. 21, 2022    (JP) .................................. 2022-185906

(51) Int. Cl.
*H04N 23/63*    (2023.01)
*H04N 23/69*    (2023.01)
*H04N 23/695*    (2023.01)

(52) U.S. Cl.
CPC ........... *H04N 23/633* (2023.01); *H04N 23/69* (2023.01); *H04N 23/695* (2023.01)

(58) Field of Classification Search
CPC .... H04N 23/633; H04N 23/69; H04N 23/695; H04N 23/60; H04N 23/661
See application file for complete search history.

(56) References Cited

U.S. PATENT DOCUMENTS

| | | | |
|---|---|---|---|
| 11,062,515 B1* | 7/2021 | Bogacz | G06T 19/003 |
| 2016/0373639 A1* | 12/2016 | Westmacott | G01S 5/0027 |
| 2021/0125640 A1* | 4/2021 | Andersson | H04N 23/695 |
| 2023/0119771 A1* | 4/2023 | Brimhall | H04N 23/631 |
| | | | 345/419 |

FOREIGN PATENT DOCUMENTS

| | | | |
|---|---|---|---|
| JP | 2005347795 A | 12/2005 | |
| JP | 2012119971 A | 6/2012 | |

* cited by examiner

*Primary Examiner* — Christopher K Peterson
(74) *Attorney, Agent, or Firm* — Canon U.S.A., Inc. IP Division

(57) ABSTRACT

An apparatus includes a capturing unit, a change unit configured to change an imaging range in which an image is to be captured by the capturing unit, a processor, and a memory for storing instructions to be executed by the processor, wherein, in a case where the instructions stored in the memory are executed by the processor, the apparatus functions as an acquisition unit configured to acquire information about a plurality of external devices from the plurality of external devices, and a determination unit configured to determine an external device about which the information is to be acquired among the plurality of external devices based on the imaging range changed by the change unit.

19 Claims, 7 Drawing Sheets

FIG.7

| PRIORITY | COMMAND CLASS | EXAMPLE OF INFORMATION |
|---|---|---|
| 1 | Battery Command Class | REMAINING BATTERY CAPACITY |
| 2 | Notification Command Class | SMALL REMAINING BATTERY CAPACITY NOTIFICATION, MOVEMENT DETECTION NOTIFICATION |
| 3 | Multilevel Sensor Command Class | TEMPERATURE, HUMIDITY, BRIGHTNESS, ETC. |
| 4 | Meter Command Class | DIMMING AMOUNT, SOUND VOLUME, ETC. |
| 5 | Powerlevel Command Class | POWER CONSUMPTION |
| 6 | Basic Command Class | BASIC OPERATION |

701

IMAGE CAPTURING APPARATUS, CONTROL UNIT FOR IMAGE CAPTURING APPARATUS, AND STORAGE MEDIUM

BACKGROUND

Technical Field

The aspect of the embodiments relates to an image capturing apparatus, a control unit for the image capturing apparatus, and a storage medium.

Description of the Related Art

Some image capturing apparatuses capable of controlling Internet of things (IoT) devices (hereinbelow, referred to as devices) can be connected to as many as 100 or more devices. However, a user may be confused if the user is notified of information about all connected devices. For this reason, it is necessary to select the device required by the user from the connected devices and to notify the user of the information about the selected device.

In order to solve the above-described issue, there is a known method of acquiring information about a device located near an imaging range based on information about an imaging direction and the imaging range of an image capturing apparatus and notifying a user of the acquired information. According to Japanese Patent Application Laid-Open No. 2012-119971, a technique for displaying a monitoring video is discussed in which an imaging direction, position information about a monitoring object, and additional information are acquired from an external system and the monitoring object is associated with the additional information based on imaging direction information and the position information and is displayed superimposed on a video. According to Japanese Patent Application Laid-Open No. 2005-347795, a technique is discussed in which a mobile information device including an image capturing unit acquires tag information attached to an object at a time of capturing an image of the object and stores position information about the object in association with the image.

Some of image capturing apparatuses can be connected to as many as 100 or more devices, so that it takes time for the image capturing apparatuses to acquire information about many devices located near the imaging range based on information about the imaging direction and the imaging range of the image capturing apparatuses. Since the imaging direction is changed by pan/tilt driving and the imaging range is changed by lens driving, it often happens that information about all of the devices cannot be acquired within an imaging period.

In a case where the technique discussed in Japanese Patent Application Laid-Open No. 2012-119971 is used, the invention relates to displaying the additional information about the object within the imaging range, and it takes time to acquire information about many objects, so that it may not be possible to acquire information about all objects within the imaging period. Even in a case where the technique discussed in Japanese Patent Application Laid-Open No. 2005-347795 is used, it takes time to acquire information about many devices, and it may not be possible to acquire information about all devices within the imaging period.

Thus, it is conceivable that information related to an external device with high priority cannot be displayed.

SUMMARY

According to an aspect of the embodiments, an apparatus includes a capturing unit, a change unit configured to change a range in which an image is to be captured by the capturing unit, a processor, and a memory for storing instructions to be executed by the processor, wherein, in a case where the instructions stored in the memory are executed by the processor, the apparatus functions as an acquisition unit configured to acquire information about a plurality of external devices from the plurality of external devices, and a determination unit configured to determine an external device about which the information is to be acquired among the plurality of external devices based on the imaging range changed by the change unit.

Further features of the disclosure will become apparent from the following description of exemplary embodiments with reference to the attached drawings.

BRIEF DESCRIPTION OF THE DRAWINGS

FIG. 7 illustrates an example of a list of prioritized communication protocols according to the third exemplary embodiment.

DESCRIPTION OF THE EMBODIMENTS

An image capturing apparatus according to an exemplary embodiment of the disclosure can be installed in various devices having a function of capturing a moving image. Examples of devices having a function of capturing a moving image include an image capturing apparatus such as a network camera, a video camera, and a still camera, and a mobile phone and a mobile information terminal, which have a similar image capturing function.

The present exemplary embodiments are to be described that relate to a control method for acquiring information about a device (also referred to as an external device) located near an imaging range based on a pan/tilt position and a lens position in an image capturing apparatus having a communication format according to a Z-Wave wireless communication protocol. The aspect of the embodiments is not limited to the Z-Wave wireless communication protocol, and a communication format is not limited to the example. The device is, for example, an external device in conformity with Z-Wave, such as a temperature sensor or a humidity sensor.

The exemplary embodiments are to be described in detail with reference to the attached drawings by taking a case where the disclosure is applied to an image capturing apparatus such as a network camera as an example. The disclosure is not limited to the exemplary embodiments to be described below.

[Overall Configuration]

Figure 1:
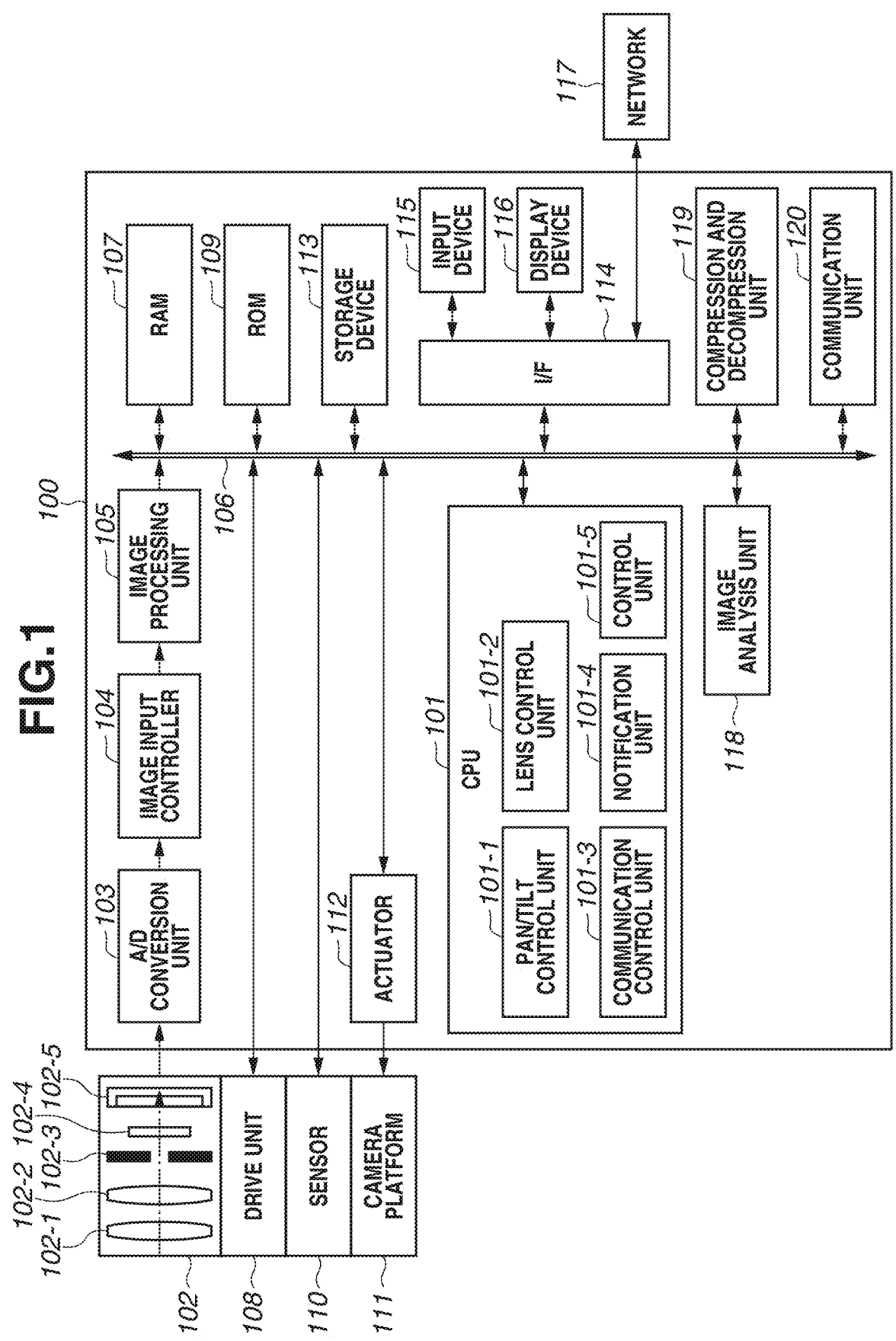
FIG. 1 is an example of a schematic diagram illustrating a configuration of an image capturing apparatus according to first, second, and third exemplary embodiments.

FIG. 1 is a schematic diagram illustrating a configuration of an image capturing apparatus 100.

A central processing unit (CPU) 101 includes a pan/tilt control unit 101-1, a lens control unit 101-2, a communication control unit 101-3, a notification unit 101-4, and a control unit 101-5 according to the present exemplary embodiment.

An image capturing unit 102 includes a zoom lens 102-1, a focus lens 102-2, a diaphragm 102-3, an infrared cut filter 102-4, and an imaging element 102-5 including an image sensor or the like. The image capturing unit 102 is an example of applying an image capturing unit according to the aspect of the embodiments. The zoom lens 102-1 and the focus lens 102-2 are moved along an optical axis by a drive unit 108. The diaphragm 102-3 is driven by the drive unit 108 to adjust an amount of light passing through the diaphragm 102-3. The infrared cut filter 102-4 is driven and operated by the drive unit 108. The infrared cut filter 102-4 is inserted in a case where illuminance of an object to be imaged is sufficient, and the imaging element 102-5 receives light that does not include infrared light. The infrared cut filter 102-4 is removed in a case where illuminance of an object to be imaged is not sufficient, and the imaging element 102-5 receives light including infrared light. In a case where the infrared cut filter 102-4 is removed, infrared illumination may be turned on toward the object in order to assist visibility in a dark area and to ensure the illuminance of the infrared light.

The drive unit 108 is controlled by the lens control unit 101-2 and the control unit 101-5.

A sensor 110 includes one or more of an acceleration sensor, an angular velocity sensor, and a geomagnetic sensor, detects acceleration, angular velocity, and azimuth displacement associated with the image capturing unit 102 at a predetermined sampling rate, and notifies the CPU 101 of the detected data via a bus 106.

A camera platform 111 includes a pan drive unit and a tilt drive unit. The pan drive unit of the camera platform 111 includes a bottom case and a turntable, and the image capturing unit 102 is panned by rotating the turntable in a horizontal direction. The pan drive unit of the camera platform 111 according to the present exemplary embodiment can rotate from −175 degrees to +175 degrees in a right-and-left direction. The tilt drive unit of the camera platform 111 includes a column provided on the turntable and the image capturing unit 102, and the image capturing unit 102 rotates in a vertical direction.

The tilt drive unit of the image capturing apparatus 100 according to the present exemplary embodiment can rotate from 0 degrees in the horizontal direction to 90 degrees in an upward direction. In this way, the image capturing unit 102 can rotate in the horizontal and vertical directions via an actuator 112 and capture an image by changing the imaging direction, and the actuator 112 is controlled by the control unit 101-5.

The imaging element 102-5 performs photoelectric conversion on light passing through the zoom lens 102-1, the focus lens 102-2, the diaphragm 102-3, and the infrared cut filter 102-4 to generate an analog image signal. The generated analog image signal is subjected to amplification processing by sampling processing such as correlated double sampling and then is input to an analog-to-digital (A/D) conversion unit 103. A parameter used for amplification processing is controlled by the CPU 101.

The A/D conversion unit 103 converts the amplified analog image signal into a digital image signal.

The A/D conversion unit 103 outputs the digital image signal obtained by conversion to an image processing unit 105.

An image input controller 104 takes in the digital image signal from the A/D conversion unit 103 and outputs the digital image signal to the image processing unit 105.

The image processing unit 105 performs various types of digital image processing on the digital image signal input from the image input controller 104 based on sensitivity information at the time of imaging and output from the imaging element 102-5, such as automatic gain control (AGC) gain or International Organization for Standardization (ISO) sensitivity, and then stores the digital image signal in a random access memory (RAM) 107 connected to the bus 106 via the bus 106. The various types of digital image processing include optical black processing, pixel correction processing, aberration correction, correction of decrease in peripheral illumination, gain processing, white balance processing, red-green-blue (RGB) interpolation processing, dynamic range expansion processing, color difference signal conversion, offset processing, gamma correction processing, noise reduction processing, contour correction processing, color tone correction processing, light source type determination processing, and scaling processing.

The RAM 107 is a volatile memory such as a static RAM (SRAM) and a dynamic RAM (DRAM).

A read-only memory (ROM) 109 is a nonvolatile memory such as an electrically erasable and programmable ROM (EEPROM) and a flash memory.

A storage device 113 is a hard disk drive (HDD), a solid state drive (SSD), an embedded multimedia card (eMMC) or the like.

A program for realizing a function according to the present exemplary embodiment and data used in executing the program are stored in the ROM 109 or the storage device 113. These program and data are loaded into the RAM 107 via the bus 106 as appropriate under the control of the CPU 101, executed by the CPU 101, and function as each unit according to the present exemplary embodiment.

An interface (I/F) 114 includes various interfaces related to input and output. The I/F 114 is connected to an input device 115 such as operation keys including a release switch and a power source switch, a cross key, a joystick, a touch panel, a keyboard, and a pointing device (for example a mouse), receives instruction information, and notifies the CPU 101 of the information via the bus 106. The I/F 114 is connected to a display device 116 such as a liquid crystal display (LCD) display, and displays information related to an image temporarily recorded in the RAM 107 and an operation menu. The I/F 114 is connected to a network 117 via a local area network (LAN).

An image analysis unit 118 is a processing unit that performs image analysis such as face detection, person detection, moving object detection, passage detection, congestion detection, trajectory detection, and leaving/carrying away detection. The CPU 101 is notified of an image analysis result via the bus 106.

A compression and decompression unit 119 performs compression processing on an image and generates compressed data in response to a control instruction from the CPU 101 via the bus 106. The compressed data is output to the display device 116 and the network 117 via the I/F 114. The compression and decompression unit 119 generates non-compressed data by performing decompression processing in a predetermined format on the compressed data stored in the storage device 113 as a recording unit.

As compression and decompression processing in the predetermined format, a compression method conforming to the Joint Photographic Experts Group (JPEG) standard is applied to a still image, and compression and decompression processing conforming to standards such as Motion-JPEG, Moving Picture Experts Group (MPEG) 2, Advanced Video Coding (AVC)/H. 264, and AVC/H. 265 is applied to a moving image.

A communication unit 120 is controlled by the communication control unit 101-3 and communicates with a device by performing wireless communication based on the Z-Wave wireless communication protocol.

The first exemplary embodiment is the control method for selecting a device to be prioritized among devices located near the imaging range based on changes in a pan/tilt position and a zoom position of the image capturing apparatus 100 in the Z-Wave wireless communication protocol and acquiring information about the selected device.

The communication control unit 101-3 acquires information about a moving direction and a moving speed of pan/tilt from the pan/tilt control unit 101-1 and movement information about the zoom position from the lens control unit 101-2, determines the device (external device) about which information is to be acquired, and acquires the information about the determined device. The notification unit 101-4 notifies a user of the acquired information superimposed on a captured moving image.

Figure 2:
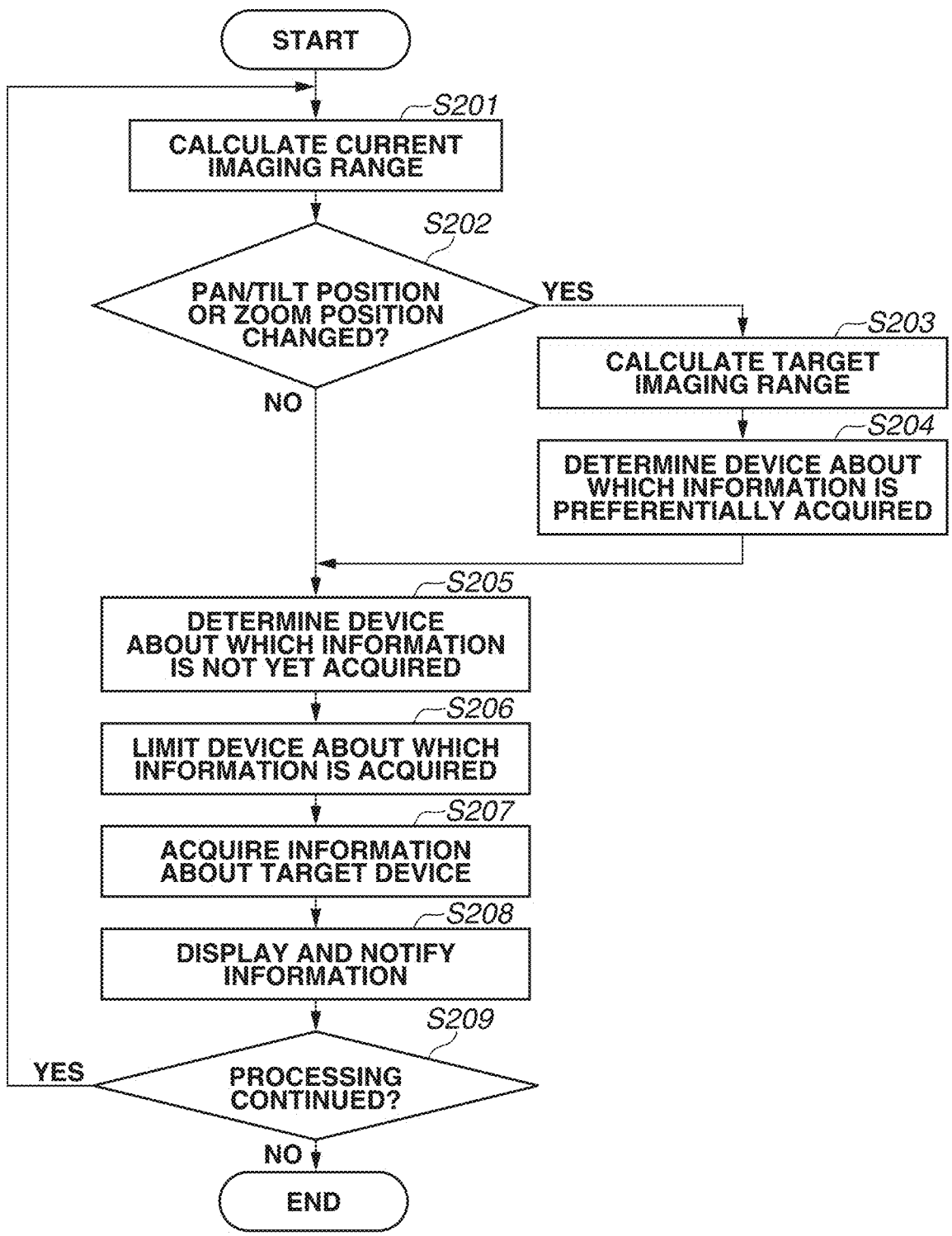
FIG. 2 is an example of a flowchart illustrating processing executed by the image capturing apparatus according to the first exemplary embodiment.
Figure 5:
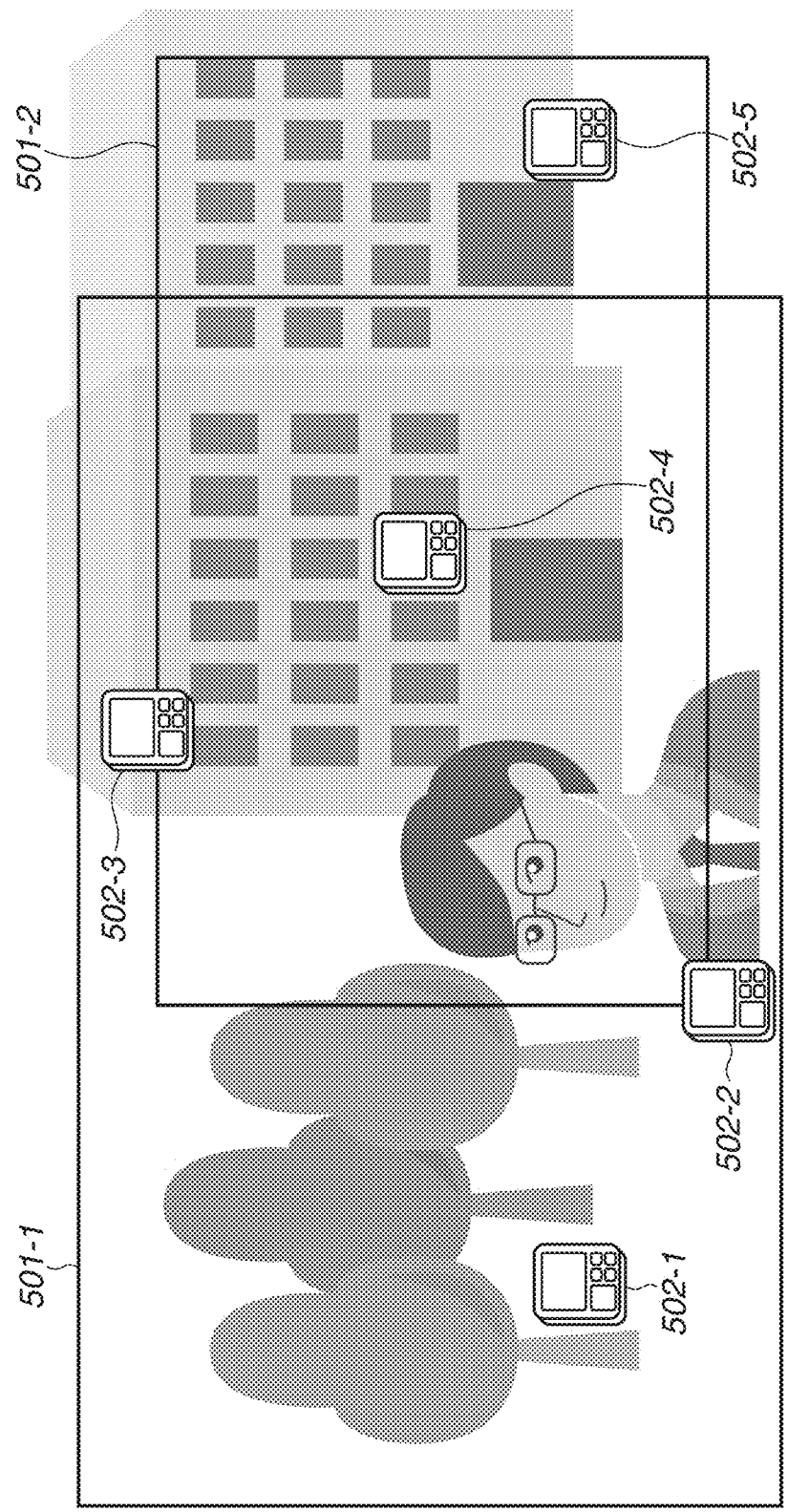
FIG. 5 illustrates an example of an imaging range panned and zoomed in a direction to the right according to the first exemplary embodiment.

An execution procedure illustrated in a flowchart according to the first exemplary embodiment in FIG. 2 is to be described in association with a function of each unit according to the first exemplary embodiment with reference to FIG. 1 and FIG. 5.

Processing in each step in the flowchart illustrated in FIG. 2 is executed and realized by the CPU 101 of the image capturing apparatus 100.

<Step S201>

In step S201, the communication control unit 101-3 acquires a current pan/tilt position value from the pan/tilt control unit 101-1 and a current zoom position value from the lens control unit 101-2. The communication control unit 101-3 calculates a current imaging range from the acquired pan/tilt position and zoom position.

<Step S202>

In step S202, the image capturing apparatus 100 determines whether a request to change the pan/tilt position to the pan/tilt control unit 101-1, a request to change the zoom position to the lens control unit 101-2, or a request to change both of the pan/tilt position and the zoom position has been received in response to an instruction from, for example, a user or a system.

In a case where the image capturing apparatus 100 determines that the request to change the pan/tilt position, the request to change the zoom position, or the request to change both of the pan/tilt position and the zoom position has been received (YES in step S202), the processing proceeds to step S203. In a case where the image capturing apparatus 100 determines that the request to change the pan/tilt position and the request to change the zoom position have not been received (NO in step S202), the processing proceeds to step S205.

In a case where the change request is received in step S202, the lens control unit 101-2, the pan/tilt control unit 101-1, or the control unit 101-5 of the image capturing apparatus 100 starts a pan operation, a tilt operation, or a zoom (zoom in or zoom out) operation corresponding to a content of the received change request. The lens control unit 101-2, the pan/tilt control unit 101-1, or the control unit 101-5 is an example of applying a movement unit of the aspect of the embodiments and performs control to move the imaging range in which an image is to be captured by the image capturing unit.

<Step S203>

In step S203, the image capturing apparatus 100 uses the communication control unit 101-3 to acquire a pan/tilt position value of a requested moving target from the pan/tilt control unit 101-1 and a zoom position value of the moving target from the lens control unit 101-2. The image capturing apparatus 100 calculates a moving target imaging range based on the acquired pan/tilt position value and zoom position value.

<Step S204>

In step S204, the image capturing apparatus 100 uses the communication control unit 101-3 to determine an external device that satisfies any one of following (Condition 1) to (Condition 6) or a combination of the conditions as a device (external device) about which information is to be acquired over other external devices based on the moving target imaging range calculated in step S203 and/or the moving direction. Each condition can be applied in an arbitrarily predetermined order. A priority of acquiring information from devices (external device) may be set in the order of devices determined as the devices (external device) about which information is to be acquired.

(Condition 1) An external device that is included in the current imaging range, but is not included in the imaging range if the imaging range moves to the moving target imaging range. That is, the external device is located on a side opposite to side in a moving direction of the moving imaging range among external devices included in the current imaging range.

(Condition 2) An external device that is not included in the current imaging range but is included in the imaging range that is moved to the moving target imaging range.

(Condition 3) An external device that is not included in the current imaging range but is located in a pan or tilt moving direction of the moving target imaging range.

(Condition 4) An external device that is located on the side in the moving direction of the moving imaging range among external devices included in the current imaging range.

(Condition 5) An external device about which information is not yet acquired by the image capturing apparatus 100 among external devices included in a current captured image before zooming in and not included in the moving target imaging range changed by zooming in.

(Condition 6) An external device about which information is not yet acquired by the image capturing apparatus 100 among external devices included in the moving target imaging range changed by zooming in.

The processing in step S204 is an example of applying a determination unit of the aspect of the embodiments, and the external device about which information is to be acquired by an acquisition unit is determined based on the moving direction of the imaging range to be moved by the movement unit.

The determination unit determines the external device about which the information is to be acquired by the acquisition unit among the external devices included in the imaging range based on the moving direction of the imaging range to be moved by the movement unit.

The determination unit determines the external device that is located in the moving direction of the imaging range to be moved by the movement unit and is not included in the current imaging range as the external device about which the information is to be acquired over the other external devices.

The determination unit determines the external device on the side in the moving direction of the imaging range that is moved by the movement unit among the external devices included in the imaging range as the external device about which information is to be acquired over the external device on the opposite side in the moving direction.

The determination unit determines the external device on the opposite side of the side in the moving direction of the imaging range that is moved by the movement unit among the external devices included in the imaging range as the external device about which information is to be acquired over the external device on the side in the moving direction.

The determination unit determines the external device about which information is not yet acquired among the external devices included in the captured image before zooming in and not included in the imaging range changed by zooming in as the external device about which information is to be acquired over the other external devices.

The determination unit determines the external device about which information is not yet acquired among the external devices included in the imaging range changed by zooming in as the external device about which information is to be acquired over the other external devices.

FIG. 5 is an example for describing a diagram in which the imaging range is changed from a current imaging range 501-1 to a moving target imaging range 501-2.

FIG. 5 illustrates that the imaging range is changed from the current imaging range 501-1 to the moving target imaging range 501-2 by panning and zooming in the right direction.

With reference to FIG. 5, a case is to be described in which the external device satisfying the above-described condition 1 is to be acquired over the other external devices.

In a case where the imaging range is moved from the current imaging range 501-1 to the imaging range 501-2, devices 502-1, 502-2, and 502-3 will not be included in the current imaging range (angle of view), so that the image capturing apparatus 100 acquires information about the devices 502-1, 502-2, and 502-3 over other devices.

Subsequently, the image capturing apparatus 100 acquires information about the external device that satisfies the above-described condition 2 over the other external devices. Specifically, in a case where the imaging range is moved from the current imaging range 501-1 to the imaging range 501-2, the image capturing apparatus 100 gives a next priority to acquiring information about a device 502-5 to be newly captured by a pan movement in order to quickly display the information acquired from the device. Since a device 502-4 is located in the imaging ranges 501-1 and 501-2, information about the device 502-4 is not acquired.

As described above, the method for determining a device about which information is to be acquired is described according to the present exemplary embodiment, but the method is not limited to the example, and another condition may be used.

<Step S205>

In step S205, the image capturing apparatus 100 uses the communication control unit 101-3 to determine a device about which information is not yet acquired among the devices about which information is to be acquired determined in step S204. In a case where there is no device about which information is to be acquired determined in step S204, the image capturing apparatus 100 determines a device about which information is not yet acquired among the devices included in the current imaging range calculated in step S201.

<Step S206>

In step S206, the image capturing apparatus 100 uses the communication control unit 101-3 to acquire a pan/tilt moving speed from the pan/tilt control unit 101-1 and to limit and determine again a device about which information is to be acquired based on the moving speed. The moving speed is a moving speed instructed by a user or the like.

In step S206, for example, in a case where the imaging range is moved from the current imaging range 501-1 to the imaging range 501-2 at the moving speed of a predetermined value or more, the devices 502-1, 502-2, and 502-3 that satisfy the above-described condition 1 are excluded from the device about which information is to be acquired, and then the device 502-5 that satisfies the condition 1 is determined again as the device about which information is to be acquired. There is not limitation in a case where the pan/tilt movement is not performed.

The processing in step S206 is also an example of applying the determination unit according to the aspect of the embodiments, and the number of external devices about which information is to be acquired by the acquisition unit is limited based on the moving speed of the imaging range by the movement unit.

The processing in step S206 is not essential processing and may be skipped to proceed to step S207.

<Step S207>

In step S207, the image capturing apparatus 100 uses the communication control unit 101-3 to acquire information about the device determined in step S206 or S205. The image capturing apparatus 100 transmits an acquisition request for acquiring information such as a measurement result measured by the device (external device), and acquires the information transmitted by the device in response to the request. In a case where a priority is set, the image capturing apparatus 100 acquires the information about the device in descending order of priority. The processing in step S207 or the communication control unit 101-3 is an example of applying the acquisition unit according to the aspect of the embodiments, and the information about the external device is acquired from the external device captured by the image capturing unit.

<Step S208>

In step S208, the image capturing apparatus 100 controls the notification unit 101-4 to display a display screen generated by superimposing the information about the device acquired in step S207 on a moving image captured by the image capturing unit 102 on the display device 116 via the I/F 114. The image capturing apparatus 100 can perform control to transmit the display screen to an external display device (notify an external display device of the display screen) via the network 117 to display the display screen. The processing in step S208 or the notification unit 101-4 is an example of applying a control unit according to the aspect of the embodiments, and performs control to superimpose and display information acquired by the acquisition unit on a moving image including the external device and captured by the image capturing unit.

<Step S209>

In step S209, the image capturing apparatus 100 determines whether to continue processing. In a case where the processing is to be continued (YES in step S209), the processing returns to step S201. In a case where the processing is not to be continued (NO in step S209), the processing is terminated. Whether to continue the processing is determined based on an instruction from a user or the system.

As described above, according to the present exemplary embodiment, an external device about which information is to be acquired can be determined based on a moving direction of an imaging range. A device about which information is to be acquired can be determined in response to changes in a pan/tilt position and a zoom position, and an image capturing apparatus can acquire the information about the device to be prioritized among devices located near the imaging range and notify a user of the information within an imaging period.

A second exemplary embodiment of the disclosure is to be described.

According to the second exemplary embodiment, a technique is to be described for determining a device to be prioritized among devices located near an imaging range based on changes in a pan/tilt position and a zoom position of the image capturing apparatus 100 and an estimated response time to a communication request in the Z-Wave wireless communication protocol, and acquiring information about the device.

The communication control unit 101-3 acquires pan/tilt movement information from the pan/tilt control unit 101-1 and zoom position movement information from the lens control unit 101-2, determines a device about which information is to be acquired based on an estimated response time to a communication request, and acquires information about the determined device. The notification unit 101-4 notifies (transmits to) a user of the acquired information superimposed and displayed on a moving image.

Figure 3:
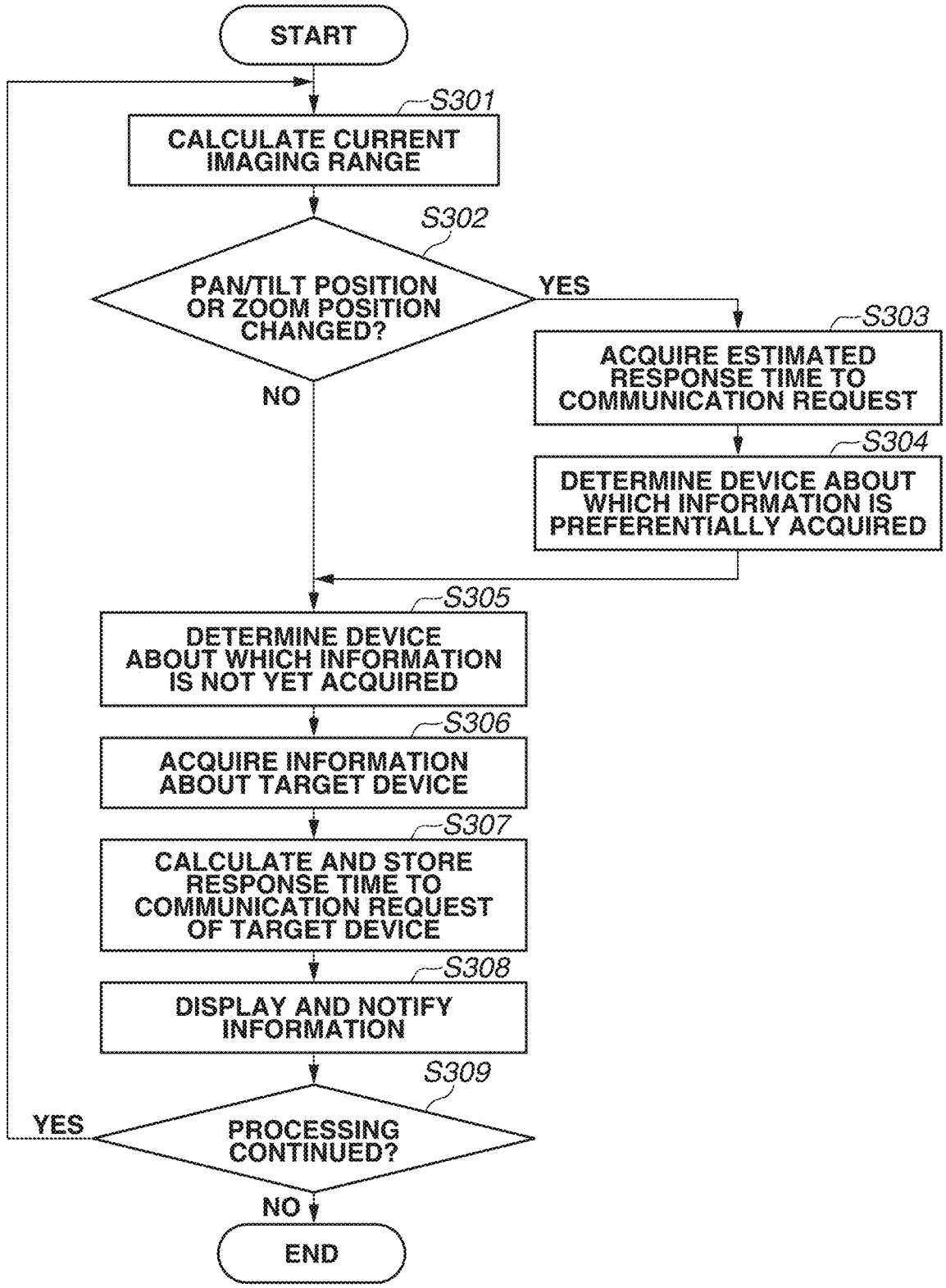
FIG. 3 is an example of a flowchart illustrating processing executed by the image capturing apparatus according to the second exemplary embodiment.

An execution procedure illustrated in a flowchart according to the second exemplary embodiment in FIG. 3 is to be described with reference to FIG. 6.

Processing in each step in the flowchart illustrated in FIG. 3 is executed and realized by the CPU 101 of the image capturing apparatus 100. According to the second exemplary embodiment, parts different from the first exemplary embodiment are to be mainly described.

<Step S301>

Processing in step S301 is the same as that in step S201 according to the first exemplary embodiment, and thus the description of the processing in step S301 is omitted.

<Step S302>

Processing in step S302 is the same as that in step S202 according to the first exemplary embodiment, and thus the description of the processing in step S302 is omitted.

<Step S303>

In step S303, the image capturing apparatus 100 uses the communication control unit 101-3 to acquire an average response time to a communication request of each device (external device) calculated in step S307 to be described below and to estimate a response time to a communication request of each device based on the average response time.

Figure 6:
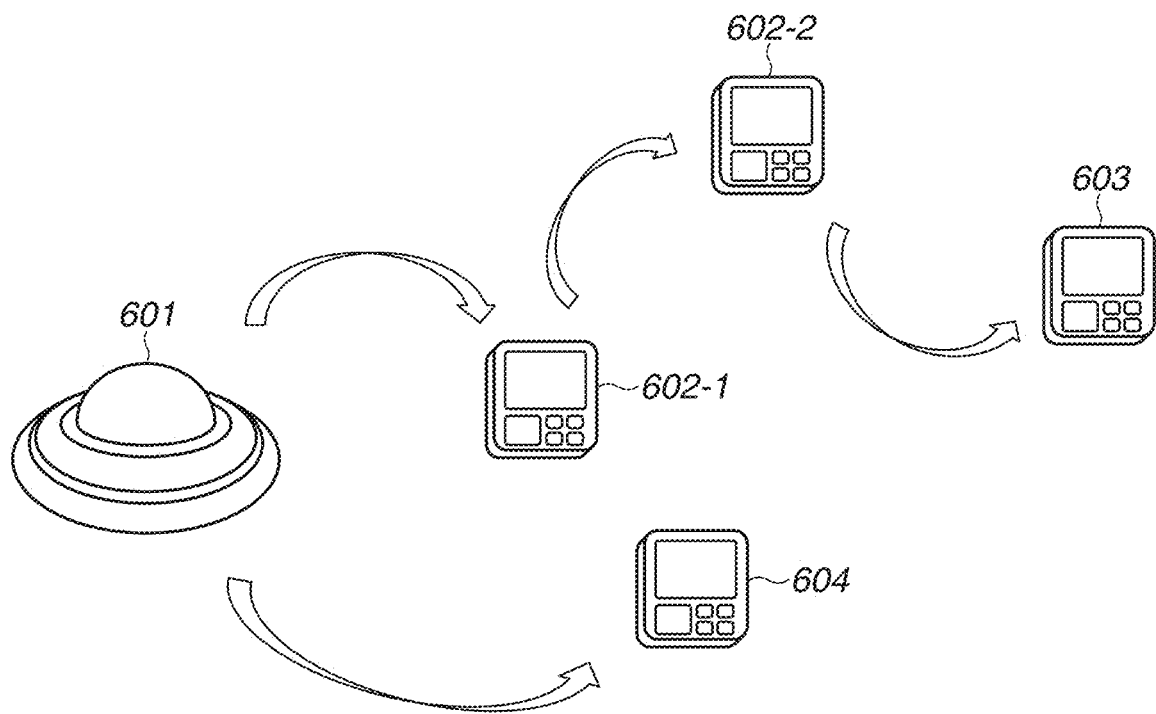
FIG. 6 illustrates an example of hop communication in a Z-Wave wireless communication network according to the second exemplary embodiment.

FIG. 6 illustrates an example of hop communication in a Z-Wave wireless communication network. An image capturing apparatus 601 (image capturing apparatus 100) communicates with a device 603 via relay devices 602-1 and 602-2. In this case, a response to a communication request to the device 603 takes longer time than a response to a communication request to a device 604.

In a case where there is no average response time of communication requests calculated in step S307, such as in a start-up for the first time, a predetermined response time is used.

<Step S304>

In step S304, the image capturing apparatus 100 uses the communication control unit 101-3 to determine a device that requires a predetermined time or longer in the estimated response time of each device acquired in step S303 as a device about which information is to be acquired. The device about which information is to be acquired may be determined in descending order of the estimated response time.

The processing in step S304 is an example of applying the determination unit according to the aspect of the embodiments, and the external device about which information is to be acquired is determined based on the response time for acquiring the information from the external device.

<Step S305>

Processing in step S305 is the same as that in step S205 according to the first exemplary embodiment, and thus the description of the processing in step S305 is omitted to avoid redundancy.

<Step S306>

Processing in step S306 is the same as that in step S207 according to the first exemplary embodiment, and thus the description of the processing in step S306 is omitted.

<Step S307>

In step S307, the image capturing apparatus 100 uses the communication control unit 101-3 to calculate and store an average value of a time from making the communication request to the response in step S306 and a past response time.

The image capturing apparatus 100 stores an average value of the past response times from when an acquisition request for information such as a measurement result measured by the device (external device) is transmitted to when the information is acquired from the device (external device) in step S306 as the estimated response time. According to the present exemplary embodiment, the average value of the past response times is regarded as the estimated response time, but another method may be used as long as the estimated response time can be calculated based on the past response time.

<Step S308>

Processing in step S308 is the same as that in step S208 according to the first exemplary embodiment, and thus the description of the processing in step S308 is omitted.

<Step S309>

Processing in step S309 is the same as that in step S209 according to the first exemplary embodiment, and thus the description of the processing in step S309 is omitted.

As described above, according to the present exemplary embodiment, a device about which information is to be acquired is selected in response to changes in a pan/tilt position and a zoom position and a response time to a communication request, and thus an image capturing apparatus can respond to a change in a response time to a communication request generated in communication using a hop function in the Z-Wave wireless communication protocol illustrated in FIG. 6, acquire information to be prioritized among information about devices located near an imaging range, and notify a user of the acquired information within an imaging period.

A third exemplary embodiment of the disclosure is to be described.

Figure 4:
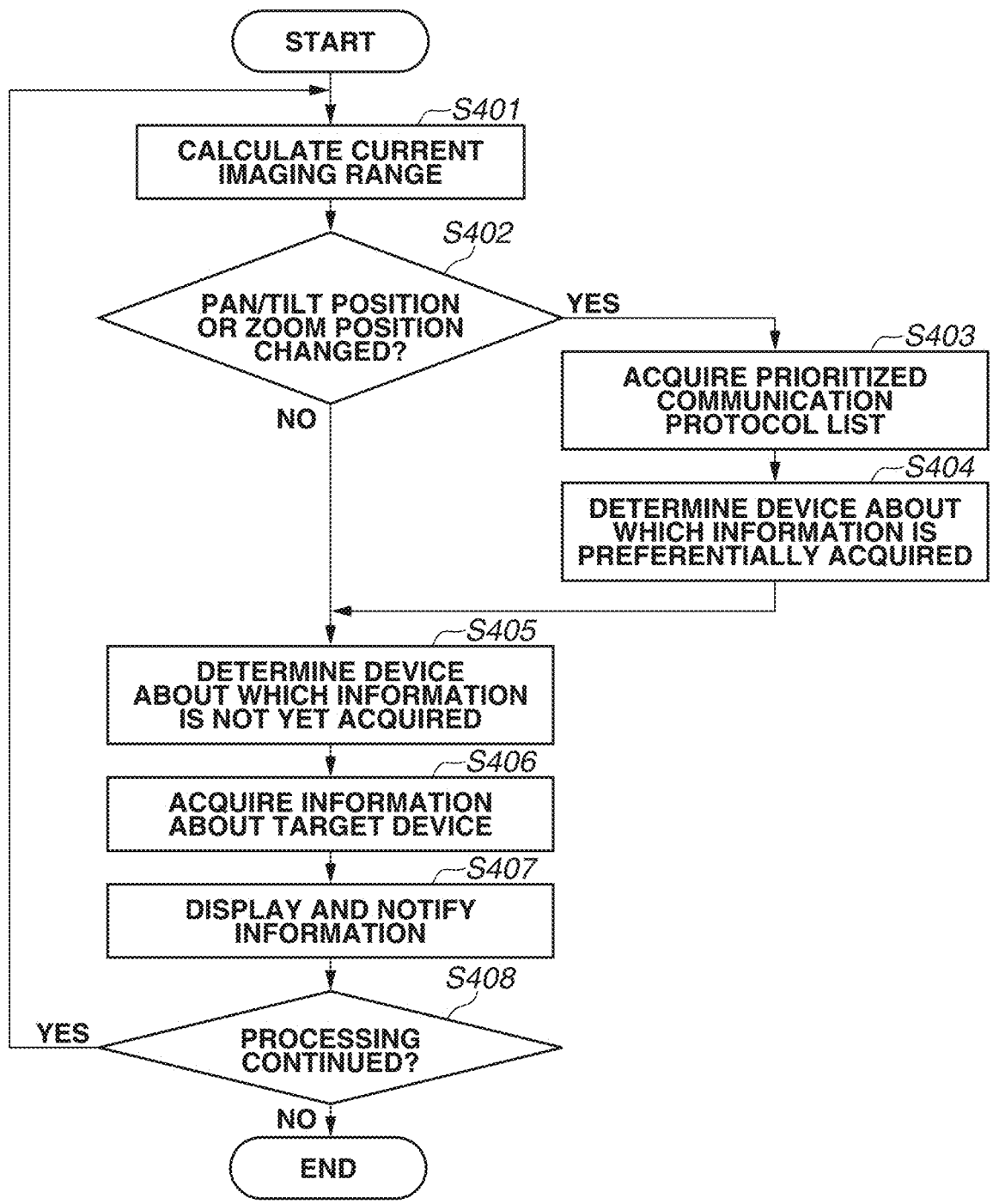
FIG. 4 is an example of a flowchart illustrating processing executed by the image capturing apparatus according to the third exemplary embodiment.

Processing in each step in a flowchart illustrated in FIG. 4 is executed and realized by the CPU 101 of the image capturing apparatus 100. According to the third exemplary embodiment, parts different from the first exemplary embodiment are to be mainly described.

The third exemplary embodiment is a control method for selecting a device to be prioritized among devices located near an imaging range based on changes in a pan/tilt position and a zoom position of the image capturing apparatus 100 and a list of prioritized communication protocols in the Z-Wave wireless communication protocol and acquiring information about the selected device.

The communication control unit 101-3 acquires pan/tilt movement information from the pan/tilt control unit 101-1 and zoom position movement information from the lens control unit 101-2, determines a device about which information is to be acquired based on the list of prioritized communication protocols, and acquires information about the target device. The notification unit 101-4 notifies a user of the acquired information.

An execution procedure illustrated in the flowchart according to the third exemplary embodiment in FIG. 4 is to be described with reference to FIG. 7.

<Step S401>

Processing in step S401 is the same as that in step S201 according to the first exemplary embodiment, and thus the description of the processing in step S401 is omitted.

<Step S402>

Processing in step S402 is the same as that in step S202 according to the first exemplary embodiment, and thus the description of the processing in step S402 is omitted.

<Step S403>

In step S403, the image capturing apparatus 100 uses the communication control unit 101-3 to acquire the list of prioritized communication protocols.

FIG. 7 is an example of the list of prioritized communication protocols.

A communication protocol list 701 indicates that a command class for acquiring a remaining battery capacity has a highest priority, a command class for notifying a user of a small remaining battery capacity and movement detection has a second highest priority, a command class for acquiring information such as temperature, humidity, and brightness has a third highest priority, a command class for setting and acquiring dimming and sound volume has a fourth highest priority, a command class for dealing with power consumption and the like has a fifth highest priority, and a command class for a basic operation has a lowest priority. In the communication protocol list 701, the priority is set for each command class corresponding to a type of information acquired from the external device in the communication protocol for communicating with the external device. The image capturing apparatus 100 can determine the external device about which information is to be acquired based on the priority.

The present exemplary embodiment is not limited to the example of the list of prioritized communication protocols.

The list of prioritized communication protocols may be registered in advance, such as at a time of product shipment. It is also possible for a user to customize the priority of the command class of the prioritized communication protocol.

<Step S404>

In step S404, the image capturing apparatus 100 uses the communication control unit 101-3 to determine a device about which information is to be acquired based on the prioritized communication protocol list 701 acquired in step S403.

For the device determined in step S204 described in the first exemplary embodiment, the priority of the command class set in advance to the device can be further identified using the communication protocol list 701, and the device about which information is to be acquired can be determined in descending order of priority.

The processing in step S404 is performed by the determination unit according to the aspect of the embodiments, and the external device about which information is to be acquired is determined based on a command corresponding to a type of information acquired from the external device by the acquisition unit of the communication protocol for communicating with the external device.

<Step S405>

Processing in step S405 is the same as that in step S205 according to the first exemplary embodiment, and thus the description of the processing in step S405 is omitted.

<Step S406>

Processing in step S406 is the same as that in step S207 according to the first exemplary embodiment, and thus the description of the processing in step S406 is omitted.

<Step S407>

Processing in step S407 is the same as that in step S208 according to the first exemplary embodiment, and thus the description of the processing in step S407 is omitted.

<Step S408>

Processing in step S408 is the same as that in step S209 according to the first exemplary embodiment, and thus the description of the processing in step S408 is omitted.

According to the present exemplary embodiment, a device about which information is to be acquired is selected in response to changes in a pan/tilt position and a zoom position and a list of prioritized communication protocols, and thus information to be prioritized among information about devices located near an imaging range can be acquired and notified based on an imaging direction and field angle information about an image capturing apparatus within an imaging period.

While the disclosure has been described in detail with reference to exemplary embodiments, it is to be understood that the disclosure is not limited to the specific exemplary embodiments, and various modifications, alterations, and combinations thereof can be made within the scope of the disclosure described in the claims.

The aspect of the embodiments can also be realized by processing for supplying a program that realizes one or more functions of the above-described exemplary embodiments to a system or an apparatus via a network or a storage medium, and reading and executing the program by one or more processors in a computer of the system or the apparatus. The aspect of the embodiments can also be realized by a circuit (for example, an application specific integrated circuit (ASIC)) for realizing one or more functions.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-185906, filed Nov. 21, 2022, which is hereby incorporated by reference herein in its entirety.

What is claimed is:

1. An apparatus comprising:
a capturing unit;
a change unit configured to change an imaging range in which an image is to be captured by the capturing unit;
a processor; and
a memory for storing instructions to be executed by the processor,
wherein, in a case where the instructions stored in the memory are executed by the processor, the apparatus functions as:
an acquisition unit configured to acquire information about a plurality of external devices from the plurality of external devices; and
a determination unit configured to determine an external device about which the information is to be acquired among the plurality of external devices based on the imaging range changed by the change unit.

2. The apparatus according to claim 1 further comprising a control unit configured to perform control to superimpose and display information acquired by the acquisition unit on a moving image including the external device and captured by the capturing unit.

3. The apparatus according to claim 1, wherein the determination unit determines the external device about which the information is to be acquired among the plurality of external devices included in the imaging range based on a moving direction of the imaging range to be moved by the change unit.

4. The apparatus according to claim 1, wherein the determination unit determines an external device that is located in a moving direction of the imaging range to be moved by the change unit and is not included in a current imaging range as the external device about which the information is to be acquired over other external devices.

5. The apparatus according to claim 1,
wherein the change unit moves the imaging range by causing the capturing unit to perform a pan or tilt operation, and
wherein the determination unit determines an external device on a side in a moving direction of the imaging range being moved by the movement unit among the external devices included in the imaging range as the external device about which the information is to be acquired over an external device on an opposite side in the moving direction.

6. The apparatus according to claim 1,
wherein the change unit moves the imaging range by causing the capturing unit to perform a pan or tilt operation, and
wherein the determination unit determines an external device on an opposite side in a moving direction of the imaging range being moved by the movement unit among the external devices included in the imaging range as the external device about which the information is to be acquired over an external device on a side in the moving direction.

7. The apparatus according to claim 1,
wherein the change unit changes the imaging range by zooming in, and
wherein the determination unit determines an external device about which the information is not yet acquired among the external devices that are included in a captured image before zooming in and are not included in the imaging range changed by zooming in as the external device about which the information is to be acquired over other external devices.

8. The apparatus according to claim 1,
wherein the change unit changes the imaging range by zooming in, and
wherein the determination unit determines an external device about which the information is not yet acquired among the external devices included in the imaging range changed by zooming in as the external device about which the information is to be acquired over other external devices.

9. The apparatus according to claim 1, wherein the determination unit determines the external device about which the information is to be acquired based on a response time for acquiring the information from the external device.

10. The apparatus according to claim 1, wherein the determination unit determines the external device about which the information is to be acquired based on a command of a communication protocol for communicating with the external device and corresponding to a type of the information acquired from the external device by the acquisition unit.

11. The apparatus according to claim 1, wherein the determination unit limits a number of external devices about which the information is to be acquired by the acquisition unit based on a moving speed of the imaging range to be moved by the change unit.

12. A method for controlling an apparatus including a capturing unit, the method comprising:
changing an imaging range in which an image is to be captured by the capturing unit;
acquiring information about a plurality of external devices from the plurality of external devices; and
determining an external device about which the information is to be acquired among the plurality of external devices based on the imaging range changed by the changing.

13. The method according to claim 12 further comprising performing control to superimpose and display information acquired by the acquiring on a moving image including an external device and captured by the capturing.

14. The method according to claim 12, wherein the determining determines the external device about which the information is to be acquired among the plurality of external devices included in the imaging range based on a moving direction of the imaging range to be moved by the changing.

15. The method according to claim 12, wherein the determining determines an external device that is located in a moving direction of the imaging range to be moved by the changing and is not included in a current imaging range as the external device about which the information is to be acquired over other external devices.

16. A non-transitory computer-readable storage medium configured to store a computer program for an apparatus including a capturing unit to execute the following:
 changing an imaging range in which an image is to be captured by the capturing unit;
 acquiring information about a plurality of external devices from the plurality of external devices; and
 determining an external device about which the information is to be acquired among the plurality of external devices based on the imaging range changed by the changing.

17. The non-transitory computer-readable storage medium according to claim 16 further comprising performing control to superimpose and display information acquired by the acquiring on a moving image including an external device and captured by the capturing.

18. The non-transitory computer-readable storage medium according to claim 16, wherein the determining determines the external device about which the information is to be acquired among the plurality of external devices included in the imaging range based on a moving direction of the imaging range to be moved by the changing.

19. The non-transitory computer-readable storage medium according to claim 16, wherein the determining determines an external device that is located in a moving direction of the imaging range to be moved by the changing and is not included in a current imaging range as the external device about which the information is to be acquired over other external devices.

* * * * *